United States Patent [19]
Tripsa

[11] Patent Number: 5,873,682
[45] Date of Patent: Feb. 23, 1999

[54] PIVOTING TOOL HOLDER

[75] Inventor: Marius Tripsa, Columbia, S.C.

[73] Assignee: Koyo Corporation of USA, Orangeburg, S.C.

[21] Appl. No.: 833,240

[22] Filed: Apr. 14, 1997

[51] Int. Cl.⁶ .................................................. B23B 27/16
[52] U.S. Cl. .............................. 407/101; 407/83; 407/89; 82/160; 409/233
[58] Field of Search ................................ 407/101, 89, 66, 407/73, 76, 77, 81, 82, 83, 87, 88, 92, 94, 96, 97; 82/160; 409/232, 233, 234

[56] References Cited

U.S. PATENT DOCUMENTS

| | | | |
|---|---|---|---|
| 334,042 | 1/1886 | Noyes | 407/83 X |
| 807,166 | 12/1905 | Grant . | |
| 954,049 | 4/1910 | Quast . | |
| 997,568 | 7/1911 | Lindgren . | |
| 1,522,587 | 1/1925 | Hallstrom . | |
| 2,495,368 | 1/1950 | Egli | 407/89 X |
| 2,753,617 | 7/1956 | Felenchak . | |
| 3,410,160 | 11/1968 | Le Barre . | |
| 3,492,709 | 2/1970 | Le Barre . | |
| 4,211,510 | 7/1980 | Hopkins . | |
| 4,229,128 | 10/1980 | Heisner . | |
| 4,632,614 | 12/1986 | Rall et al. | 409/233 |
| 4,648,763 | 3/1987 | Safranek . | |
| 4,655,656 | 4/1987 | Schurfeld | 82/160 X |
| 4,813,831 | 3/1989 | Reinauer | 82/160 X |

FOREIGN PATENT DOCUMENTS

| | | | |
|---|---|---|---|
| 2854149 | 7/1980 | Germany | 407/87 |
| 3427124 | 1/1985 | Germany | 82/160 |

*Primary Examiner*—Andrea L. Pitts
*Assistant Examiner*—Henry W. H. Tsai
*Attorney, Agent, or Firm*—Michael A Mann; Nexsen Pruet Jacobs & Pollard LLP

[57] ABSTRACT

The present invention is a tool holder for supporting a cutting insert during a material-removal process. The tool holder comprises a body having a channel formed therein for receiving a finger that extends from a head. The finger is secured within the channel by an assembly screw that permits the head to move between a retracted position and an extended position relative to the body. When the head is in its extended position, the head is permitted to pivot relative to the body; however, when the head is in its retracted position a pair of shoulders on the body engage a pair of notches on the head, preventing the head from pivoting. A locking screw is also provided that locks the head to the body. The locking screw is designed so that as the locking screw is tightened, the head is urged against the body, thus providing a positive known position for the insert each time the head is moved. In an alternative embodiment, the body and head are provided with a first and second flange, respectively, that engage each other and limit the pivotal movement of the head between a first position and a second position, 180° away from the first position.

13 Claims, 4 Drawing Sheets

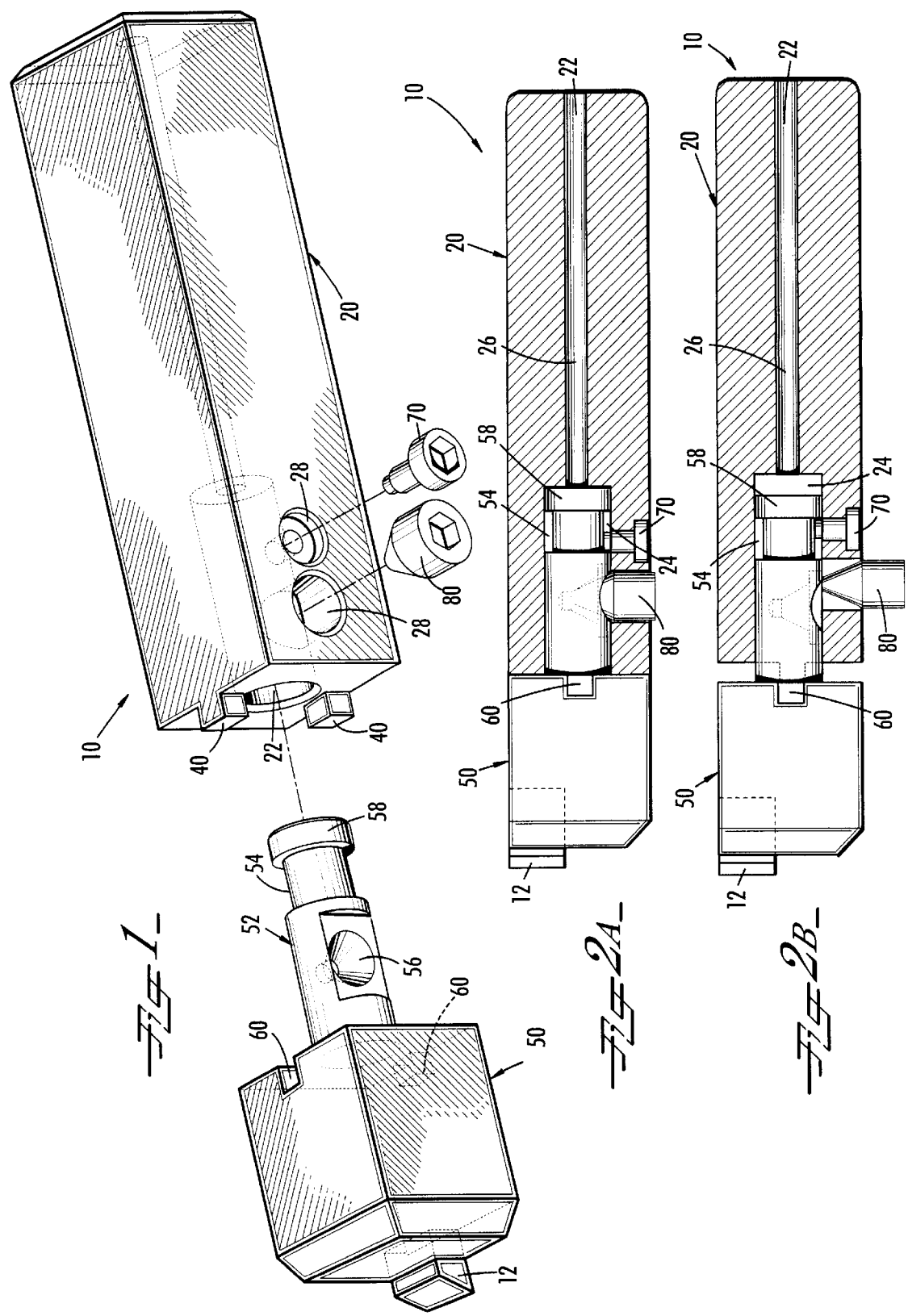

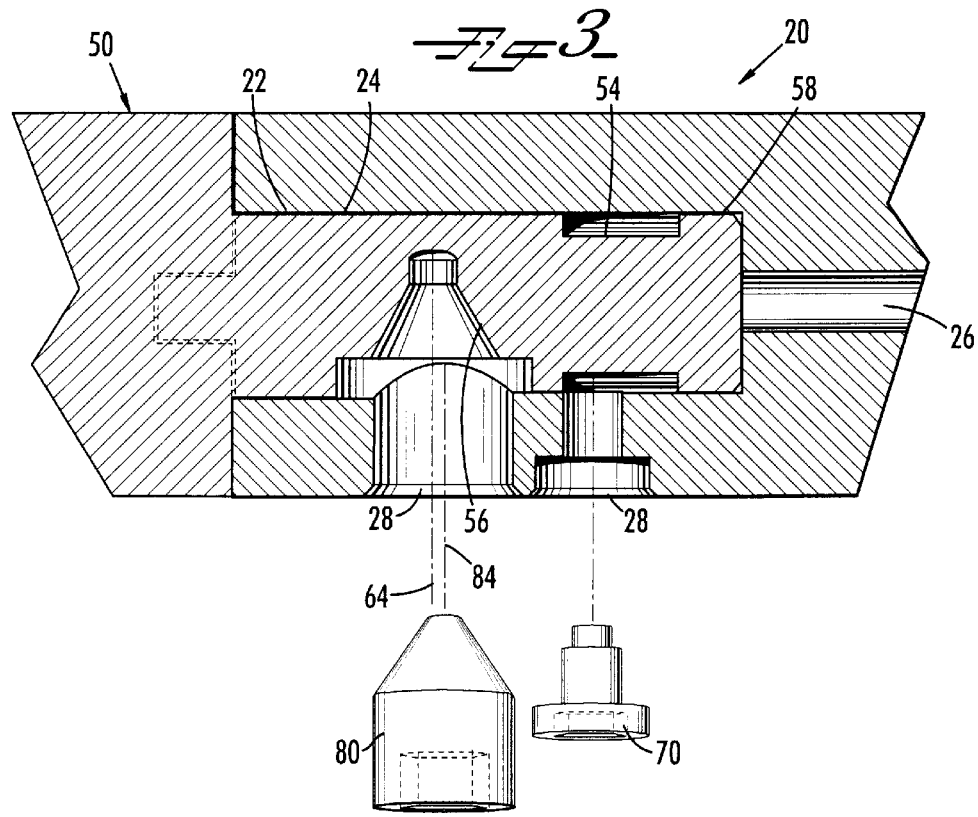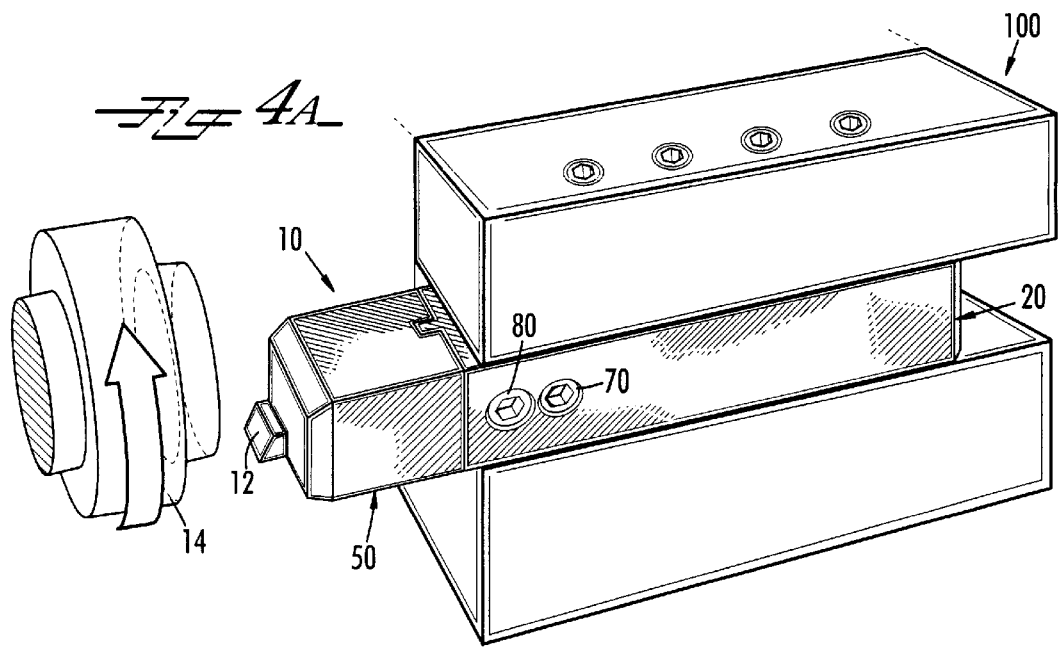

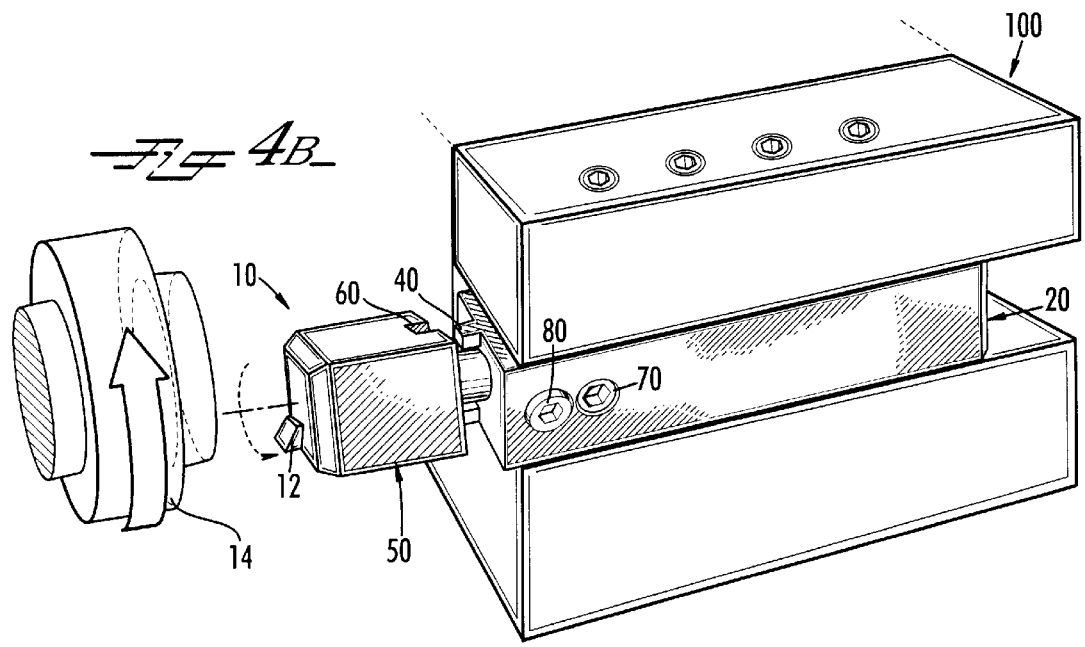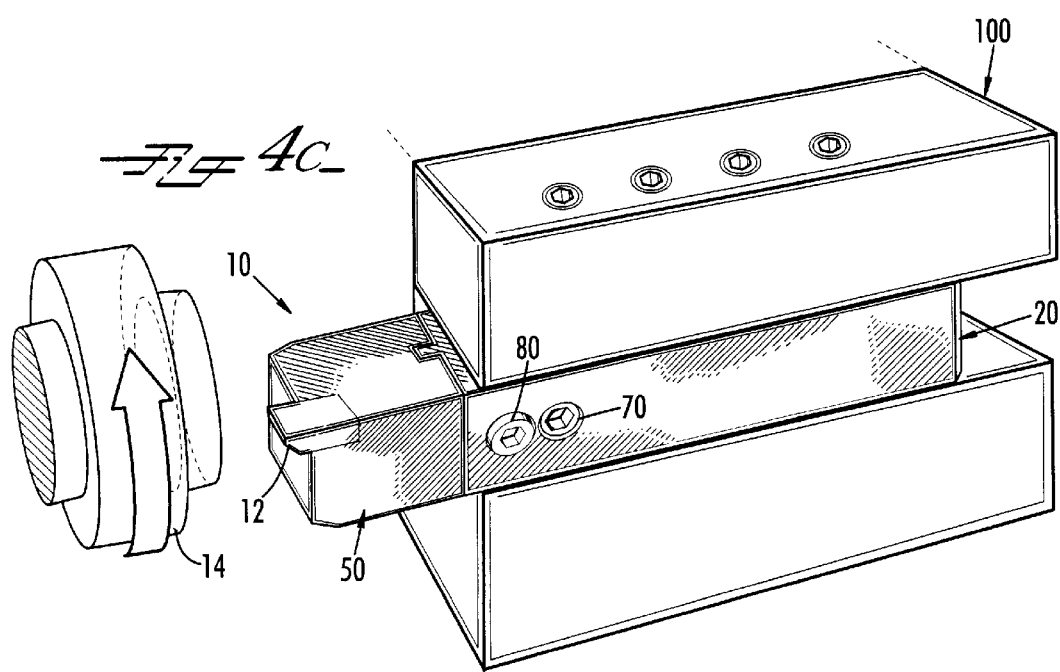

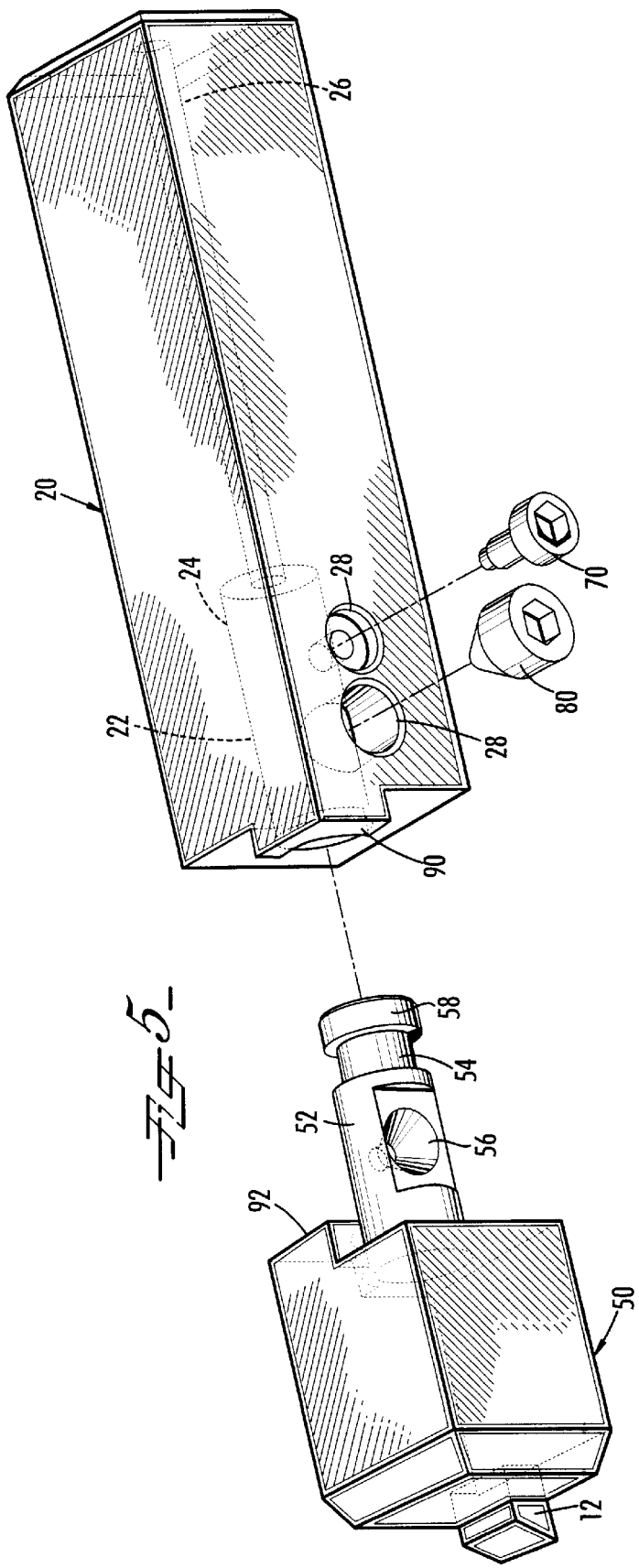

PIVOTING TOOL HOLDER

BACKGROUND OF THE INVENTION

1. Field of the Invention

The present invention relates to tool holders. In particular, the present invention relates to a tool holder for supporting a cutting insert.

2. Discussion of Background

In high speed manufacturing processes, time is of the essence. The amount of time in which a process line or manufacturing station is down and not producing parts makes the difference between a profitable line and an unprofitable line. Consequently, it is extremely important to reduce the amount of down time, which then increases the efficiency of the line and reduces the cost per manufactured unit.

There are several types of manufacturing processes that can be used to produce a specific part. One such process is a material removal process, where material from a block of raw material, such as steel, aluminum, etc., is removed to form the desired end product. In the removal process, a tool holder supports an insert in a cutting position, so that as the block of raw material moves relative to the insert, the insert cuts away and removes the undesired material. After a number of cutting operations, the cutting surface of the insert wears and must be changed so that the manufactured parts remain within allowable tolerances. However, due to the positions and physical constraints of the inserts during the removal process, the insert is not typically accessible. Consequently, the tool holder must usually be removed from its position to change the insert. Removing and replacing the tool holder takes a relatively large amount of time. In addition, the tool holder and insert must be readjusted once replaced, so that the resulting product falls within allowable tolerances, a step which takes additional time.

Furthermore, the insert when in position is typically close to fast moving parts. Consequently, there is a danger to the operator associated with accessing the insert and replacing or changing the cutting surfaces while in position.

Therefore, there is a need for a tool holder which will support a cutting insert, where the insert may be accessed and replaced while reducing the amount of time necessary for the replacement. In addition, the tool holder should allow the insert to be accessed and replaced, while reducing any danger to the operator.

SUMMARY OF THE INVENTION

According to its major aspects and broadly stated, the present invention is a tool holder for supporting a cutting insert during a materialremoval, manufacturing process. The tool holder comprises a body having a channel extending therein and a head having a finger that is capable of being received by the channel. There are also a pair of screws, an assembly screw and a locking screw that respectively secure and lock the finger within the channel and thus the head to the body. When the finger is positioned within the channel, the assembly screw engages a reduced diameter portion of the finger, thus securing the finger within the channel. However, when the assembly screw is in position, the head is permitted to move between a retracted position and an extended position relative of the body. When the head is in its extended position, the head can pivot relative to the body, and when the head is in its retracted position, means carried by the head and body prohibits the head from pivoting relative to the body. During the material-removal process, the head is in the retracted position, but when it is necessary to change the insert, the head can be moved to its extended position and then pivoted to a position where the insert can be easily accessed.

The locking screw, in the preferred embodiment, has a conical surface that engages a bore within the finger where the bore has an inverted conical surface. An important feature of the present invention is the fact that the centerlines of the bore and locking screw are offset, so that as the locking screw is tightened, the head is pulled tightly against the body, thus locking it in position. By pulling the head against the body, the insert always returns to the same position that the head has been moved between its retracted and extended position, thus assuring consistent manufacturing tolerances.

Another important feature of the present invention is the way the assembly screw engages the reduced diameter portion of the finger. The assembly screw secures the finger within the channel, but allows the head to move between its extended and retracted positions as the assembly screw slides within the reduced diameter portion. In addition, the interaction of the assembly screw with the reduced diameter portion permits the head to pivot relative to the body when the head is in its extended position. Furthermore, if the head of the tool holder is damaged during the materialremoval process, the assembly screw can be removed along with the locking screw, allowing the head to be replaced with another undamaged head. Once the assembly screw and locking screw are replaced, the new head will be in the original position of the damaged head.

In the preferred embodiment, there are a pair of shoulders extending from the body proximate to the channel that engage a pair of matching notches on the head, when the head is in the retracted position. When the shoulder and notches engage each other, the head is prohibited from pivoting relative to the body. However, when the head is in its extended position, the shoulders are removed from the notches, allowing the head to pivot relative to the body. The combination of the shoulders and notches are another important feature of the present invention, because the shoulders help bear the rotational stresses between the head and body during the material-removal process. In addition, the shoulders and notches provide a positive, known location for the insert each time the head is moved or replaced, thus assuring that the manufactured products remain within allowable tolerances.

In another preferred embodiment, the head and body have flanges that engage each other. In this embodiment the assembly screw and locking screw function similar to above, securing the finger within the channel and locking the head to the body, respectively. However, in this embodiment the head does not have an extended position relative to the body, but pivots between a first position and a second position, 180° from the first position. Furthermore, in the first position the insert is in a position to remove material, while in the second position the insert is in a position where the insert can be easily accessed and replaced. As above, the head can still be removed from the body once the assembly and locking screws have been removed, thus permitting the replacement of the head.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a exploded perspective view of a tool holder and insert, according to a preferred embodiment of the present invention;

FIG. 2A is a partial cross-sectional view of a tool holder with the head in its retracted position, according to a preferred embodiment of the present invention;

FIG. 2B is a partial cross-sectional view of a tool holder with the head in its extended position, according to a preferred embodiment of the present invention;

FIG. 3 is a detail, exploded cross-sectional view of a tool holder according to a preferred embodiment of the present invention;

FIG. 4A is a perspective view of a tool holder according to a preferred embodiment of the present invention;

FIG. 4B is a perspective view of a tool holder with the head in its retracted position and partially pivoted, according to a preferred embodiment of the present invention;

FIG. 4C is a perspective view of a tool holder with the head pivoted 180° relative to FIG. 4A and with insert in an easily accessible position, according to a preferred embodiment of the present invention; and FIG. 5 is a perspective view of a tool holder according to another preferred embodiment of the present invention.

DETAILED DESCRIPTION OF A PREFERRED EMBODIMENT

Referring now to the figures, a tool holder 10 for supporting a cutting insert 12 is shown. The tool holder 10 and cutting insert 12 are typically used in a material-removal manufacturing process where the cutting insert 12 removes unwanted material from a block of raw material 14, as shown in FIGS. 4A–C. While tool holder 10 and cutting insert 12 are shown against a rotating block of raw material 14, those of ordinary skill in the art will recognize that the applications of tool holder 10 in the manufacturing industry are far reaching and thus should not be limited by the applications described below.

Tool holder 10 comprises a body 20 and a head 50. Body 20, in the preferred embodiment, is a rectangular block having a channel 22 extending therein. As shown in FIGS. 1, 2A, 2B, and 3, channel 22 has a circular cross-section and a first section 24 and a second section 26. First section 24 of channel 22 has a larger diameter than second section 26; however, first section 24 and second section 26 combine to extend completely through body 20. Body 20 also has a pair of threaded apertures 28 that extend through one side of body 20 to communicate with first section 24 of channel 22. In addition, extending from body 20 at a position proximate to where first section 24 of channel 22 communicates with the exterior of body 20 are a pair of shoulders 40. Preferably, shoulders 40 are approximately rectangular blocks that extend a short distance away from the surface of body 20.

Head 50 comprises a finger 52 that is dimensioned to be received within first section 24 of channel 22. First section 24 of channel 22 should extend deep enough within body 20 and finger 52 dimensioned so that head 50 is capable of engaging body 20. Positioned proximate to where finger 52 extends from head 50 are a pair of notches 60 within head 50. In addition, finger 52 has a bore 56 extending therein and a reduced diameter portion 54, as will be described in detail below.

Head 50 has a retracted position (FIG. 2A) and an extended position (FIG. 2B). In its retracted position, shoulders 40 are received within notches 60 so that head 50 engages body 20. Finger 52 is retained within channel 22 by an assembly screw 70 that extends through an aperture 28. Assembly screw 70 engages reduced diameter portion 54, but reduced diameter portion 54 is dimensioned so that head 50 can move between its retracted and extended positions while assembly screw 70 is in position.

As stated above, when head 50 is in its retracted position, shoulders 40 extending from body 20 are received within notches 60 in head 50, thus prohibiting head 50 from pivoting relative to body 20. However, when head 50 is its extended position, as shown in FIG. 2B, the engagement of assembly screw 70 within reduced diameter portion 54 allows head 50 to pivot relative to body 20, because shoulders 40 and notches 60 are no longer in engagement.

Tool holder 10 further comprises a locking screw 80 which extends through an aperture 28 and engages bore 56 of finger 52. Locking screw 80 is designed so that as locking screw 80 is tightened, head 50 is pulled against body 20. In the preferred embodiment, this is accomplished by the specific shape of locking screw 80 and bore 56. In particular, locking screw 80 has a conical surface, while bore 56 has an inverted conical surface. The surface of locking screw 80 has a first centerline 84, and the inverted surface of bore 56 has a second centerline 64 as shown in FIG. 3. First centerline 84 is offset from second centerline 64 when finger 52 is positioned within channel 22 and head 50 is in its retracted position. Second centerline 64 is closer to head 50 than first centerline 84, so that when locking screw 80 is tightened, one side of locking screw 80 engages one side of bore 56, thus urging finger 52 farther into channel 22 and head 50 toward body 20. It will be recognized that the exact shape of locking screw 80 and bore 56 may be changed from the mating conical surfaces disclosed above. It is only necessary for them to be designed so that locking screw 80 urges head 50 against body 20 while being tightened.

The pivoting action of tool holder 10 is specifically shown in FIGS. 2A and 2B. In FIG. 2A, head 50 is in its retracted position and locking screw 80 is engaging bore 56 within finger 52, thus locking head 50 into place. In its retracted position, tool holder 10 is ready for use, with shoulders 40 prohibiting head 50 from pivoting relative to body 20, and thus absorbing the stresses exerted thereon. When it is necessary to pivot head 50, locking screw 80 is removed and head 50 is moved to its extended position. In its extended position, shoulders 40 are no longer in engagement with notches 60 and head 50 is capable of pivoting relative to body 20, so that insert 12 may be readily accessed. In addition, as can be seen in FIGS. 2A and 2B, assembly screw 70 slides within reduced diameter portion 54 as head 50 moves between its retracted and extended position. When assembly screw 70 is in position, finger 52 is secured within channel 22 and is prevented from being completely withdrawn by the engagement of assembly screw 70 against the ring 58 at the end of finger 52.

Furthermore, when head 50 is moved from its retracted position to its extended position, the fact that first section 24 and second section 26 combine to extend through body 20 prevents a vacuum from forming between finger 52 and the base of channel 22. In other words, by having channel 22 extend through body 20, channel 22 facilitates the movement of head 50 relative to body 20.

It will be recognized that insert 12 may be supported by tool holder 10 in a variety of ways. In addition, insert 12 may have a variety of shapes and several cutting surfaces. In the preferred embodiment, insert 12 is triangular in shape having six cutting surfaces, and insert 12 is removably supported within tool holder 10 by a latch (not shown). The latch holds insert 12 in place but allows insert 12 to be removed or rotated so that another of its cutting surface may be used. Furthermore, when all cutting sides of insert 12 have been worn down, it may be replaced with another unused insert 12.

In operation, as shown in FIGS. 4A–C, tool holder 10 is supported by a clamp 100, so that as the block of raw material 14 is rotated relative to tool holder 10, insert 12 can be moved into engagement with the block of raw material 14, thus removing the unwanted material. As shown in FIG. 4A, insert 12 is in an inconvenient position on the opposing side of tool holder 10. To change the cutting surface of insert 12, locking screw 80 is removed so that it no longer engages bore 56 of finger 52. Once locking screw 80 is removed, head 50 is moved to its extended position, where shoulders 40 and notches 60 are no longer engaging each other; therefore, head 50 is free to pivot. (See FIG. 4B) After head 50 has been pivoted 180°, as shown in FIG. 4C, insert 12 is in an easily accessible position where it can be changed. Head 50 can then be returned to its operating position (See FIG. 4A) and locked back into position by locking screw 80 and be ready for use.

Another embodiment of the present invention is shown in FIG. 5. In this embodiment head 50 and body 20 are similar to that described above; however, head 50 and body 20 do not have notches 60 and shoulders 40, respectively. In addition, head 50 does not move between a retracted and extended position as in the preferred embodiment, but head 50 does pivot between a first position and a second position relative to body 20. Instead of notches 60 and shoulders 40, body 20 has a first flange 90 extending from a position proximate to channel 22. First flange 90 extends around channel 22 and takes up approximately one quarter of the face of body 20. A second flange 92 extends from a position proximate to finger 52 on head 50 and also takes up approximately one-quarter of the face of head 50. Both first flange 90 and second flange 92 are positioned in one corner of body 20 and head 50, respectively, so that when locking screw 80 is removed from engagement with bore 56, head 50 is capable of pivoting relative to body 20 from a first position (shown in FIG. 5) to a second position (not shown), which is 180° from the first position. In other words, first flange 90 and second flange 92 are designed so that head 50 can pivot relative to body 20, but is limited in its range of motion by the engagement of first flange 90 against second flange 92.

In addition, finger 52 has a reduced diameter 54 portion, which is engaged by assembly screw 70 to secure finger 52 within channel 22. However, reduced diameter portion 54 need not be as large as that shown in the preferred embodiment. Reduced diameter portion 54 must only permit head 50 to pivot relative to body 20, but does not have to allow assembly screw 70 to slide therein.

First flange 90 and second flange 92 do perform some of the same functions as shoulders 40 and notches 60. In particular, the engagement of first flange 90 and second flange 92 absorbs the rotational stresses exerted on insert 12. In addition, the combination of locking screw 80 and the engagement of the flanges 90, 92 after head 50 has been interchanged or moved between its first and second position, provides a positive known position for insert 12, so that the manufactured parts are within the allowable tolerances.

It will be apparent to those skilled in the art that many changes and substitutions can be made to the preferred embodiment herein described without departing from the spirit and scope of the present invention as defined by the appended claims.

What is claimed is:

1. A tool holder for supporting a cutting insert, said tool holder comprising:

a body having a channel formed therein;

a head having a finger dimensioned to be rotatably received within said channel, said head having a retracted position and an extended position within said channel with respect to said body;

means for preventing pivoting of said head with respect to said body when said head is in said retracted position but not preventing pivoting of said head with respect to said body when said head is in said extended position;

means carried by said body for restricting movement of said head axially with respect to said body between said retracted and said extended positions but not restricting pivoting of said head; and means for locking said head in said retracted position.

2. The tool holder as recited in claim 1, wherein said finger has a reduced diameter portion and said body has an aperture formed therein in communication with said channel, and said restricting means further comprises an assembly screw dimensioned to fit in said aperture and engage said finger at said reduced diameter portion so that, when said assembly screw engages said finger at said reduced diameter portion, said head is restricted to axial movement between said retracted and said extended positions.

3. The tool holder as recited in claim 1, wherein said preventing means is a locking screw and said body has an aperture formed therein dimensionsed to receive said locking screw, said locking screw urging said head into said retracted position when received into said aperture.

4. The tool holder as recited in claim 2, wherein said preventing means is a locking screw and said body has an aperture formed therein dimensioned to receive said locking screw, said locking screw urging said head into said retracted position when received into said aperture.

5. The tool holder as recited in claim 1, wherein said channel extends through said body to facilitate removal of said head from said body.

6. A tool holder for supporting a cutting insert, said tool holder comprising:

a body having a channel and a pair of threaded apertures formed therein, said pair of threaded apertures extending through said body to communicate with said channel;

a head having a finger dimensioned to be rotatably received within said channel, said head having a retracted position and an extended position in said channel, said finger including a reduced diameter portion;

means for preventing pivoting of said head with respect to said body when said head is in said retracted position but not preventing pivoting of said head with respect to said body when said head is in said extended position;

an assembly screw dimensioned to be threaded into a first aperture of said pair of apertures and engage said reduced diameter portion of said finger so that, when said finger is received in said channel and said assembly screw is threaded into said first aperture to engage said reduced diameter portion of said finger, said head is movable between said extended position and said retracted position but not removable from said body; and a locking screw dimensioned to be threaded into a second aperture of said pair of apertures to engage said finger so that, when said finger is received within said channel and said locking screw is threaded into said second aperture, said head is locked in said retracted position.

7. The tool holder as recited in claim 6, wherein said preventing means further comprises a shoulder formed on said body and a notch formed in said head, said shoulder being receivable within said notch to prevent pivoting of said head with respect to said body when said head is in said retracted position.

8. The tool holder as recited in claim 6, wherein said preventing means further comprises a first flange formed on said body and a second flange formed on said head, said first and second flanges engaging to prevent pivoting of said head with respect to said body when said head is in said retracted position.

9. The tool holder as recited in claim 6, wherein said locking screw is formed to urge said head into said body as said locking screw is threaded into said second aperture.

10. The tool holder as recited in claim 6, wherein said finger has a conical bore formed therein and said locking screw engages said finger at said conical bore.

11. The tool holder as recited in claim 6, wherein said finger has a conical bore formed therein and said locking screw is formed to have a conical end that engages said conical bore in said finger when said locking screw is threaded into said second aperture.

12. The tool holder as recited in claim 6, wherein said finger has a conical bore formed therein and having a centerline and said locking screw is formed to have a conical end having a centerline, said centerline of said bore being offset with respect to said centerline of said conical end of said locking screw so that said locking screw urges said head into said body as said locking screw is threaded into said second aperture.

13. The tool holder as recited in claim 6, wherein said channel extends through said body to facilitate removal of said head from said body.

* * * * *